W. H. McLellan.
Fare Box.

No. 3,376. Reissued Apr. 13, 1869.

Witnesses.

Lyman Harding
S. L. James

Inventor.

Wm. H. McLellan

N. PETERS, PHOTO-LITHOGRAPHER, WASHINGTON, D. C.

United States Patent Office.

J. B. SLAWSON, OF NEW YORK, N. Y., ASSIGNEE, BY MESNE ASSIGNMENTS, OF W. H. McLELLAN.

*Letters Patent No.* 63,804, *dated April* 16, 1867; *reissue No.* 3,376, *dated April* 13, 1869.

IMPROVEMENT IN FARE-BOXES FOR CARS, &c.

The Schedule referred to in these Letters Patent and making part of the same.

*To all whom it may concern:*

Be it known that W. H. McLellan, of New Orleans, parish of Orleans, and State of Louisiana, hath invented a new and useful Improvement Horse-Car and Omnibus Fare-Boxes; and I, J. B. Slawson, of the city, county, and State of New York, assignee by mesne assignments of W. H. McLellan, do hereby declare the following to be a full, clear, and exact description of the same, reference being had to the annexed drawing, forming part of this specification.

Figure 1:
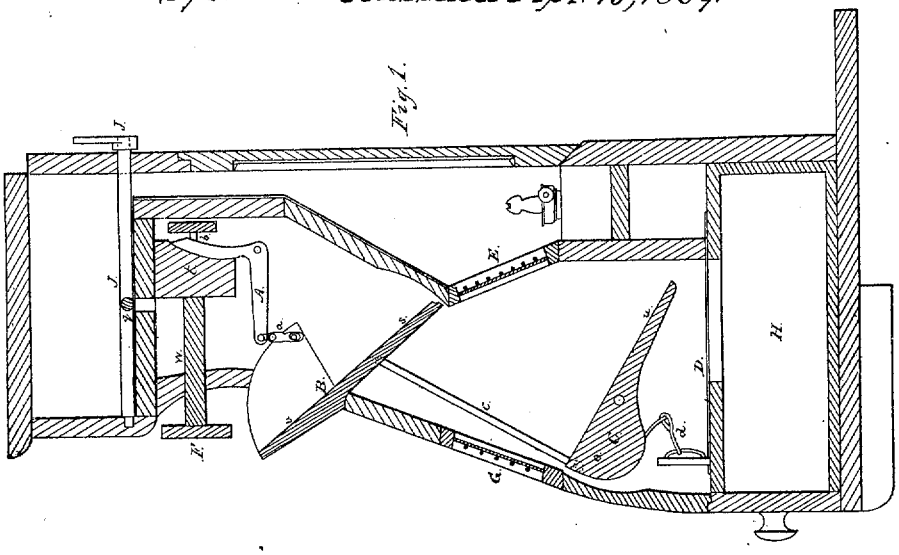

Figure 1 is a view of this improved fare-box.

Figure 2:
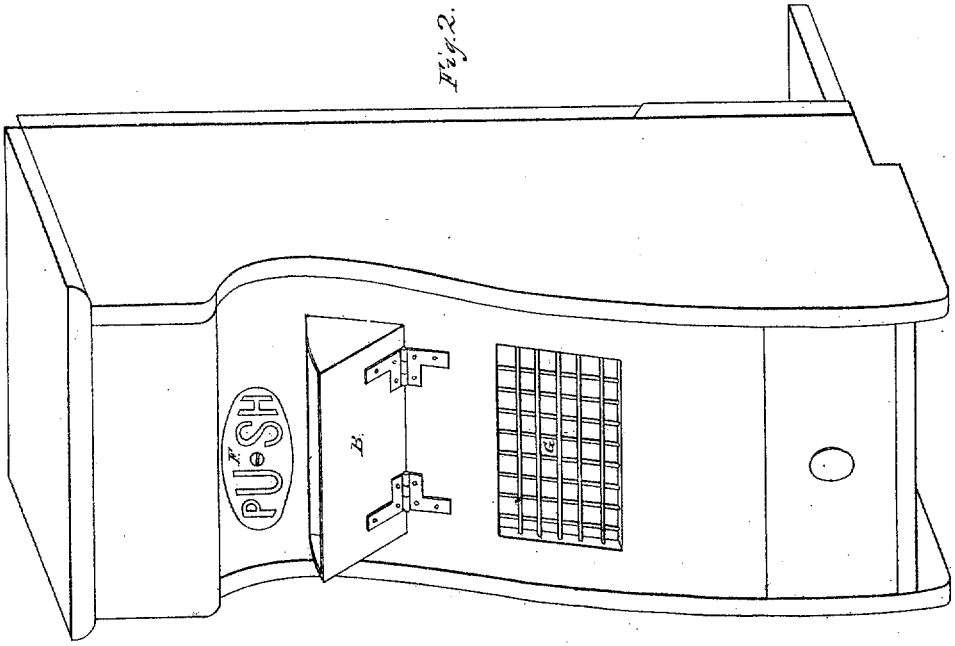

Figure 2, a vertical sectional view of the same.

Similar letters of reference indicate corresponding parts.

The object of this invention is to produce a money-receptacle, for railroad-cars, omnibuses, and other passenger-conveyances, into which the money can be deposited by the passengers, without requiring the presence of a collector, the driver, or other official, at the other side of the box being enabled to inspect its contents, and to ascertain whether the correct fare has been deposited.

The invention consists, first, in such an arrangement of oscillating tilts and reciprocating slides, that the fare, when put into the box, can be readily seen by the driver, as well as by the passenger, but will be out of reach of either. When the next fare is inserted, the one previously put in will be dropped into a box, which is covered by a sliding-plate.

The invention consists, second, in the application to a fare-box, of the aforesaid sliding-lid, which is, when the tilts are operated, automatically moved, so as to open or close the receptacle.

The invention consists, further, in the use of a device, by means of which, the driver, or other official, can at once close the fare-box to prevent the insertion of further money, while he is called away, or unable to attend to the fare, to prevent subsequent disputes between the passengers and him, as to whether the fare was paid or not.

The invention also consists of a peculiar apparatus for operating the upper tilt, which is also the gate of the fare-box, that is opened by pushing against a knob, projecting from the box.

The invention finally consists in the application of wire-netting, or other metallic open-work, to close the apertures of the fare-box, through which the contents of the box can be inspected.

Such metallic perforated windows allow the inspection of the contents, and can never be made dim by the smoke of a lamp, by which the glass panes heretofore used are, in a measure, obscured, and they can, moreover, not be so easily broken as the aforesaid glass panes.

In the construction of this invention, wood, brass, iron, or any other suitable, or two, or more different materials may be employed, as the taste and fancy of the maker may dictate, and it may be of any convenient external configuration or form.

The usual plan is to construct the outside box, K, of wood, and I prefer the form represented in the drawings, as being at once symmetrical and convenient in its proportions.

Inside the outer box K, and in its front and rear sides, are arranged the tilts, sliding-shelf, weights, and other parts, that constitute this invention, and which, by reference to the drawings, I shall now proceed to describe in detail.

A is a bent lever, or push-arm, pivoted to the box.

B, a vibrating, or partially-revolving gate and shelf, or, as I technically call it, a "tilt," pivoted to the box K, connected by a link, *a*, with the lever A.

C is also a pivoted tilt, and

D, a sliding shelf, connected with C, by means of a strap, or link, *d*, while C is connected with B, by means of a connecting-rod, *c*, and the action of all parts is thus conjoint and simultaneous.

The operation of the invention is as follows:

A knob F, which is formed on a sliding-rod, *w*, that is connected with the lever A, does, when pushed in, act upon the tilt B, and causes it to revolve sufficiently upon its axis to establish an opening at its upper end for the reception of the fare into the box, whilst at the same time the box is closed at a point a little below the opening, by the partial revolution, in an upward direction, of the other or lower end of B, and it remains closed until the knob is relieved from pressure.

Pressure being removed from the knob F, the tilt B is instantly brought back to its closed or normal position, and firmly held in such position by the superior gravity of the ends *o* and *s*, of the tilts C and B, which said ends are made very much heavier than the opposite ends *u* and *v*, of said tilts, in order to produce this result. In this position the plate B is nearly vertical, and C almost quite horizontal.

The same result may be attained by the insertion of a helical, or other suitable spring, at *b*, so placed as to press constantly against, or pull the upper end of the bent lever A, to keep the knob F in proper position to be pushed in by the next passenger who wishes to deposit a fare.

No spring is shown upon the drawings, but the same does not form an element of my claim, and any mechanic, of ordinary skill, will readily perceive how it may be introduced.

When the tilt B assumes its normal position, its lower end becomes an inclined plane, down which the fare slides, and falls upon tilt C, where it is exposed to the view of the passengers and driver, through the metallic lattice-openings E and G, until the next fare is deposited.

The connection between the parts B C D is, that when B is open, C is open, and D closed, so that when the fare drops off C, it falls upon D, where it remains until C is again closed.

As C closes, D opens, and the fare is precipitated into the locked receptacle, or cash-box H, where it remains until withdrawn by the cashier, or other person appointed for such purpose.

It will be perceived that the money deposited upon the tilt C remains thereon until the knob F is again pushed in for the payment of other fare.

In order that the driver and the passengers may know that the fare has been deposited, openings are made on the front and rear sides of the box, between the tilts B and C. These openings are covered by a lattice-screen, of strong steel, iron, or brass-wire, so constructed that the interstices are sufficiently large to allow the fare, as it lies upon the tilt C, to be clearly discerned, both from the front and rear.

It will be observed that this lattice of wire affords a far more secure bar against depredators than glass, whilst at the same time it is free from the obscuration to which glass is subjected from smoking lamps; a lamp, L, being set up in the box K for night service.

It cannot, in fact, be obscured by smoke, but presents at all times a reliable protective medium through which the fare can be distinctly seen.

If occasion call the driver temporarily off the car, a turn of the lever J fixes the knob F immovably in position, thus effectually preventing the deposition of a fare during his absence, and preventing the disputes that may frequently arise as to whether the fare has been really paid or put into the box.

The locking of the knob F, by a turn of the lever J, is effected through the agency of the projecting-pin *q*, which, when lever J is turned, interposes behind the part *t*, which, it will be seen, is connected by the bar, or rod *w*, to said knob F.

A partial revolution of the lever J partially revolves projecting-pin *q*, because they both project from the same shaft, and have a common centre, and so the latter is brought into position behind part *t*, and thus holds knob F immovably in place.

The advantages of this invention are manifold, and I proceed now, briefly, to point out some of them.

It enables the passengers to deposit the fare in the cash-box, and hence allows the driver to give a more constant attention to his animal and the car, a mere glance back being all that is required, after each passenger has entered the car, to tell him whether the fare has been deposited.

In all car fare-boxes with which I am acquainted, but particularly in the case of J. B. SLAWSON'S patented box, the part corresponding with tilt C is the last obstruction or stopping-place, of the fare before it enters the locked cash-box; and as each fare is put into the box, the driver is required to pull a wire in order to get the fare into the money-box, by a partial revolution of said part. In doing this, an opening is made, through which a hand may be inserted into the cash-box, and its contents taken out, if the glass in front of it should be broken.

In this invention, not only is the above-mentioned extra service of the driver dispensed with, but an effectual check against dishonesty is provided by the sliding shelf D, which, as we have seen, is always closed by the opening of tilt C, and interposed to protect the deposit within the cash-box.

If, therefore, the lattice of wire were broken by an instrument, or quite removed, so that a thief could insert his hand within the box, he could only, in consequence of the interposition of D, get at the single fare that might be lying on tilt C.

Another advantage of this invention over SLAWSON'S box, results from the obvious superiority of the tilts over the fixed incline planes used in the latter, and in the non-use of the knife employed in the same.

Still another advantage of this invention is found in the substitution therein of the metallic screens in lieu of glass, and such other substances as are commonly used, by which I secure a view of each fare as it is put into the box, despite smoking lamps, and at the same time provide a more durable and efficient barrier against depredators; and finally, by the introduction of the lever J, I avoid all possible chance of contention as to the payment of fares between the driver and passengers.

The various improvements embodied in this invention can be applied to fare-boxes, either separately or conjointly.

Having thus described this invention,

I claim as new, and desire to secure by Letters Patent—

1. The arrangement of the metallic screens upon opposite sides of the box, with reference to the tilt C, whereby the fare can be clearly seen and inspected by both the driver and passengers, or either, as herein described, for the purpose specified.

2. The combination of the knob F, with the lever A and gate B, all made and operating substantially as set forth, so that the gate will be self-closing, as specified.

3. The device, herein described, for enabling the driver to close the box, consisting of the lever J, and arm *q*, operating in combination with the pusher F, as specified.

4. The combination in fare-box, of the knob or pusher F, lever A, tilts B C, and slide D, all made and operating substantially as herein shown and described.

J. B. SLAWSON.

Witnesses:
FRANK BLOCKLEY,
ALEX. F. ROBERTS.